United States Patent [19]
Lucero

[11] Patent Number: 5,952,640
[45] Date of Patent: *Sep. 14, 1999

[54] GAMING MACHINE SYSTEM OPERABLE WITH GENERAL PURPOSE CHARGE CARDS

[75] Inventor: James L. Lucero, Arcadia, Calif.

[73] Assignee: Scotch Twist, Inc., New York, N.Y.

[*] Notice: This patent is subject to a terminal disclaimer.

[21] Appl. No.: 09/157,777

[22] Filed: Sep. 21, 1998

Related U.S. Application Data

[63] Continuation of application No. 08/718,206, Sep. 20, 1996, abandoned, which is a continuation of application No. 08/430,354, Apr. 28, 1995, Pat. No. 5,559,312, which is a continuation-in-part of application No. 08/060,277, May 11, 1993, Pat. No. 5,457,306, which is a continuation-in-part of application No. 07/950,980, Sep. 23, 1992, abandoned, which is a continuation of application No. 07/740,814, Aug. 6, 1991, abandoned, which is a continuation of application No. 07/453,991, Dec. 19, 1989, Pat. No. 5,038,022.

[51] Int. Cl.[6] .............................. G06F 15/21; G06F 15/44
[52] U.S. Cl. .............................. 235/380; 902/23; 463/25; 463/29
[58] Field of Search .................................... 235/375, 380; 902/23; 463/25, 29, 41

[56] References Cited

U.S. PATENT DOCUMENTS

| | | |
|---|---|---|
| 4,322,612 | 3/1982 | Lange . |
| 4,335,809 | 6/1982 | Wain . |
| 4,339,798 | 7/1982 | Hedges et al. . |
| 4,467,424 | 8/1984 | Hedges et al. . |
| 4,575,622 | 3/1986 | Pelligrini . |
| 4,594,663 | 6/1986 | Nagata et al. . |
| 4,636,951 | 1/1987 | Harlick . |
| 4,639,889 | 1/1987 | Matsumoto et al. . |
| 4,648,600 | 3/1987 | Olliges . |
| 4,652,998 | 3/1987 | Koza et al. . |
| 4,669,596 | 6/1987 | Capers et al. . |
| 4,669,730 | 6/1987 | Small . |
| 4,674,055 | 6/1987 | Ogaki et al. . |
| 4,674,618 | 6/1987 | Eglise et al . |
| 4,675,515 | 6/1987 | Lucero . |

(List continued on next page.)

FOREIGN PATENT DOCUMENTS 244274  12/1995  New Zealand .

OTHER PUBLICATIONS

"New Australian Gaming Complexes Usher In Era of Cashless Card–Based Wagering", Card News, p. 3, Jun. 6, 1988.

Ringer, R., "Casino Machines to Accept Debit Cards", American Banker, vol. 148, May 3, 1983.

"Legislation Takes Cash Out of Casinos" Las Vegas Sun, Apr. 2, 1985.

*Primary Examiner*—F. L. Evans
*Attorney, Agent, or Firm*—Cooper & Dunham LLP

[57] ABSTRACT

In a gaming establishment, a player feeds a general purpose charge card such as a VISA, MasterCard or AMERICAN EXPRESS card to a reader at a gaming machine or enters on a keyboard or other input device, information relating to the general purpose charge card, and keys in a desired amount of playing credit and optionally, a PIN (personal identification number) for automatic transmission to a remote financial institution (VISA or other charge card facility) either directly or through an intermediate transaction processing facility. Also transmitted are an identification of the gaming machine and the gaming operator. Upon approval of the requested playing credit, the gaming machine is enabled and thereafter a running net (balance) is kept for the player and/or each machine and/or the gaming operator by accounting for win-lose-draws. After the playing session is over, net playing credit information is automatically transmitted to the financial institution either directly or through an intermediate transaction processing facility so that the entire playing sessions can be a single line item on the player's regular statement from that financial institution. Provisions are made to allow a player to use the same playing credit to play on more than one machine at the same time, to quit a machine and quickly move to another and still keep the same running balance, and to move from one gaming establishment to another on the same running balance.

34 Claims, 5 Drawing Sheets

U.S. PATENT DOCUMENTS

| | | |
|---|---|---|
| 4,689,742 | 8/1987 | Troy et al. . |
| 4,727,243 | 2/1988 | Savar . |
| 4,812,805 | 3/1989 | Lachat et al. . |
| 4,815,741 | 3/1989 | Small . |
| 4,842,278 | 6/1989 | Markowicz . |
| 4,884,212 | 11/1989 | Stutsman . |
| 5,038,022 | 8/1991 | Lucero ................... 235/380 |
| 5,179,517 | 1/1993 | Sarbin . |
| 5,265,874 | 11/1993 | Dickinson . |
| 5,457,306 | 10/1995 | Lucero . |
| 5,559,312 | 9/1996 | Lucero . |
| 5,811,772 | 9/1998 | Lucero ................... 235/380 |

CREDIT PLAY AT MACHINE N, CASINO M?
Y
[READ PLAYER'S CARD
VALID CARD?] — 80
Y
ENTER PIN (OPTIONAL) — 82
VALID PIN? — 84
Y
ENTER AMOUNT OF REQUESTED PLAYING CREDIT — 86
CREDIT REMAINS FROM PREVIOUS TRANSACTION? — 88
Y
PROCESS REMAINING PLAYING CREDIT — 90
PLAYER APPROVAL? — 92
Y
PLAYER OF CREDIT GRANTED? — 94
Y
DISPLAY BALANCE AVAILABLE FOR PLAY OR PAYOUT AT MACHINE N — 96
PLAY ENABLE — 98
CREDIT REQUEST AT ADDITIONAL MACHINE? — 100
Y
PLAYER'S CREDIT BALANCE POSTIVE? — 102
Y
ENABLE ADDITIONAL MACHINE — 104
DETECT PLAY WIN OR LOSE, PAY-OUT REQUESTS, ADDITIONAL CREDIT REQUESTS, END PLAY REQUESTS — 106
UPDATE BALANCES (MACHINE, CASINO, PLAYER) — 108
DISPLAY UPDATED BALANCE — 110
CLOSE OUT REQUESTS FOR MACHINE, CASINO, DAY — 112
COMPUTE DAILY BALANCE — 114
PROCESS CLOSE OUT REQUESTS PER MACHINE, CASINO, PLAYER — 116
POST DAILY BALANCE TO CREDIT CARD PROCESS FACILITY — 118
PROCESS BALANCE AT CREDIT CARD PROCESS FACILITY — 120

FIG. 5

GAMING MACHINE SYSTEM OPERABLE WITH GENERAL PURPOSE CHARGE CARDS

REFERENCE TO RELATED APPLICATION

This application is a continuation application of Ser. No. 08/718,206 filed on Sep. 20, 1996, abandoned, which in turn is a continuation application of Ser. No. 08/430,354 filed on Apr. 28, 1995, now U.S. Pat. No. 5,559,312, which in turn is a continuation-in-part application of Ser. No. 08/060,277 filed on May 11, 1993, now U.S. Pat, No. 5,457,306 which in turn is a continuation-in-part of Ser. No. 07/950,980 filed on Sep. 23, 1992, now abandoned, which in turn is a continuation of Ser. No. 07/740,814 filed on Aug. 6, 1991 and now abandoned, which in turn is a continuation of Ser. No. 07/453,991 filed on Dec. 19, 1989 and now U.S. Pat. No. 5,038,022. Said parent applications are hereby incorporated by reference in this application in their entirety as though fully set forth herein.

TECHNICAL FIELD

The invention relates to gaming in general and in particular to using charge cards such as, for example and without limitation, VISA, MasterCard or American Express charge cards, and bank account access cards, to operate gaming machines such as, for example, slot machines. A visual display, a keyboard, and a card reader (or a device such as a keyboard, touch screen or the like for entering card and personal identification information) are associated with the gaming machine to provide playing credit to the player upon approval of the player's charge card. The terms general purpose charge card, or charge card for short, are used herein to distinguish from a prior art "house card" of the type issued for use only in a specified gaming establishment. A charge card can be a credit card (the card owner is given credit and is billed later) or a debit card (the card owner's account is debited), or some other billing and/or paying arrangement can be made between the issuer and the owner of the general purpose credit card.

BACKGROUND OF THE INVENTION

Casinos and certain other business establishments have gaming machines such as, for example only and without limitation, slot machines in which a player can insert coins, pull a handle, and hope for a winning combination of elements on spinning wheels to allow him or her to win money from the machine. These are games of chance that some individuals play for entertainment and others with the hope of receiving winnings.

Casinos typically have cashiers at windows where patrons can obtain coins or tokens to play the gaming machines. A player who runs out of coins or tokens while at a gaming machine must walk away from the machine and find a cashier to get more coins or tokens, and the player may or may not resume playing. Even if wishing to resume, the player may lose his or her place at the previously chosen machine, and some players find this annoying, e.g., because a player feels that a machine was ready for "payoff" or that the player was on a "roll" on that machine but had to discontinue play to go replenish the supply of coins or tokens. These prior systems therefore disrupt the playing of the machine in a manner which is undesirable for the casino and may also be undesirable from the standpoint of the player.

It has been proposed to use house charge cards which differ from general purpose charge cards in that they are issued by a particular gaming establishment and have restriction on use peculiar to that establishment. Such house cards would avoid the need to get coins or tokens from the cashier or to cash in coins and tokens but still would require a player who does not have such a house card to go through the procedures for obtaining one, and would tend to limit a player to the one or more establishments that have already provided that particular player with a house card. In addition, the player would have to comply with the restriction imposed on house card use by the issuing casino, e.g., would have settle the account for each house card according to the rules of the particular establishment that issued the card.

SUMMARY OF THE INVENTION

The invention relates to gaming machines and systems and particularly to a system and a method that make it possible for a player to participate in games of chance at casinos and other gaming establishments by using a general purpose charge card rather than a house card, and to a system and a method that provide a particularly efficient way for the player to obtain playing credit with a general purpose charge card, to use the playing credit and have it updated to account for wins, losses and draws from games of chance played at one or more machines at one or more casinos, and to ultimately have the player's account at a remote financial institution credited or debited and the account of the playing establishment or establishments credited or debited during and/or after a playing session.

In a particular example of the invention, which is not a limitation on the scope of the invention, a player supplies a general purpose charge card to a gaming machine at a casino, e.g., by feeding the card to a conventional magnetic card reader. The card reader reads selected information from the charge card, transmits it over a data link for validation, e.g., to the card issuer and, upon receiving back a validation over the data link, requests a personal identification number (PIN) from the player. The player enters the PIN, e.g., through a keypad, a touch screen or a keyboard at the gaming machine, which in an alternative embodiment can also be used to manually enter information that would otherwise be read from the card by the card reader. If the PIN is similarly validated, the gaming machine prompts the player to enter an amount of requested playing credit, e.g., through a display or by a voice message. The player enters an amount of requested credit, and the system determines whether to grant that requested credit on the basis of selected criteria. The determination may be made through another communication with the card issuer, or it can be made on the basis of some other criterion, such as whether the requested amount conforms to a selected threshold. Upon approval of the requested credit, or of some other amount of playing credit, the gaming machine displays to the player the amount of granted playing credit available for play or payout at that gaming machine and enables the gaming machine to use said playing credit for plays. The player then plays on that machine, and the system detects those plays and win/lose/draw results therefrom, as well as any pay-out requests by the player and any end-of-play requests by the player. The system maintains and updates credit balances for the gaming machine, for the player and for the casino in response to the detected play results, pay-out requests and end-of-play requests, and displays at least the updated balance for the player at the gaming machine. The system posts a daily balance for at least the player to a credit process facility, and processes the balances to update accounts for the player and for the casino with the card issuer.

In addition, the system determines if any playing credit remains for the player from a previous transaction, and takes such remaining credit into account in the step of determining whether to grant the requested playing credit.

Still in addition, the player can request additional playing credit, in which case the system goes through a similar validation process, and the player can request the use of playing credit at one or more additional gaming machines. If the request for such additional machines is granted, the system takes plays or requests for pay-outs and end-of-play requests at such additional gaming machines into account in maintaining said balances.

BRIEF DESCRIPTION OF THE DRAWINGS

Features of the invention are illustrated in the accompanying drawings in which like numerals represent like elements and in which:

FIG. 5 is another flow chart illustrating processing steps in obtaining and using playing credit in a gaming system and process;

DETAILED DESCRIPTION

Gambling casinos and gaming parlors typically include a variety of gaming machines such as slot machines, poker machines which play a card game and other types of machines. Some of these machines dispense coins or tokens as the player obtains a winning combination while in others credit is obtained and indicated on the machine. The player can use the credit to continue to play the machine or the credit can be converted to cash by a cashier in the casino. In such cases, a display of some type, such as a liquid crystal display, may indicate the credit available on that particular machine. However, when the credit has been used and none remains, the player must then insert more coins or tokens in order to continue playing. If that occurs, the player must leave the machine, find a cashier and then obtain more coins or tokens with which to operate the machine. In such case, the player returning to the machine may find it occupied by another player. This may be particularly frustrating to a player who believes that a particular machine is about ready for a "payoff" or that the player is on a particular lucky streak with that machine.

Figure 1:
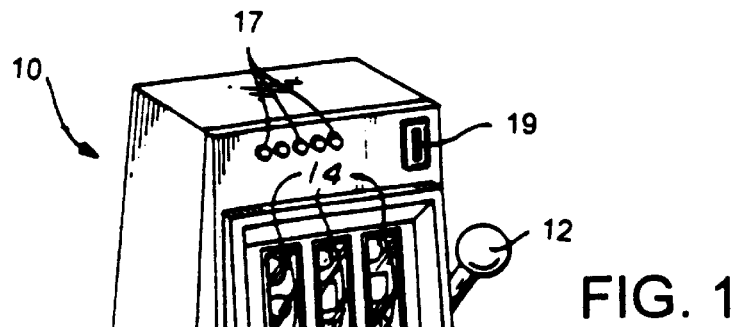
FIG. 1 is an isometric view of a gaming machine, such as a slot machine, operating in accordance with the invention for a player to obtain and use playing credit.

The gaming machine 10 illustrated in FIG. 1 includes features of the invention which enable a player to obtain credit, without having to leave the machine, with the use of a general purpose charge card such as, without limitation, a VISA, American Express or MasterCard card, or a bank account access card. In addition, other cards of the type having a prearranged amount of credit (or available debit) from a remote financial institution may be used. Each time such a charge card is used, the amount of credit available is reduced by the amount used until the granted credit is totally depleted. Such a charge card is discussed in, e.g., U.S. Pat. No. 4,575,622.

The machine 10 has indicators 14 which indicate to the player certain patterns or indicia. Particular combinations of these patterns are designated as winning combinations. The player inserts coins or tokens in a slot such as a slot 19, activates the machine by pulling the handle 12, pushing buttons or taking some other action, and observes the indicators in the displays 14 to determine if a winning combination is obtained. If so, the display 18 may indicate the amount won as a credit which the player may use to continue playing the machine without inserting additional coins or tokens. A player can elect to receive cash or tokens for the credit available, and the appropriate value is obtained either by coins or tokens dropped or dispensed into a slot or tray 16 or the credit is redeemed from a cashier.

If the player has used all of the available coins, tokens or credit won by playing the machine, or if the player wishes not to use coins or tokens at all, the present invention enables the player to obtain playing credit, or further playing credit, without leaving the machine by inserting a general purpose charge card 24 into a slot 22 or by keying in information similar in effect to that which would be read from the card by the card reading device, such as the card number. The charge card may be swiped through a groove instead of being inserted in a slot, as is known in the pertinent technology. The amount of playing credit desired is entered through the keyboard 20. The reader 26 associated with the machine 10 transmits from the card the information concerning the player to a remote location such as, for example, the player's financial institution, along with a first code 27 identifying the gaming machine and, if necessary, a second code 29 identifying the establishment where the machine is located, and any further information that may be desired. The financial institution may then credit the establishment's account and debit the player's account in the amount entered into the keyboard. In an alternative system, the gaming machine 10 may issue a credit slip indicating the amount of credit obtained and which may be signed by the player, given to a casino employee and kept by the casino for return to the player's financial institution for proper credit. Of course, the playing credit can be a prearranged amount, or an amount that is subject to selected restrictions and conditions.

Figure 2:
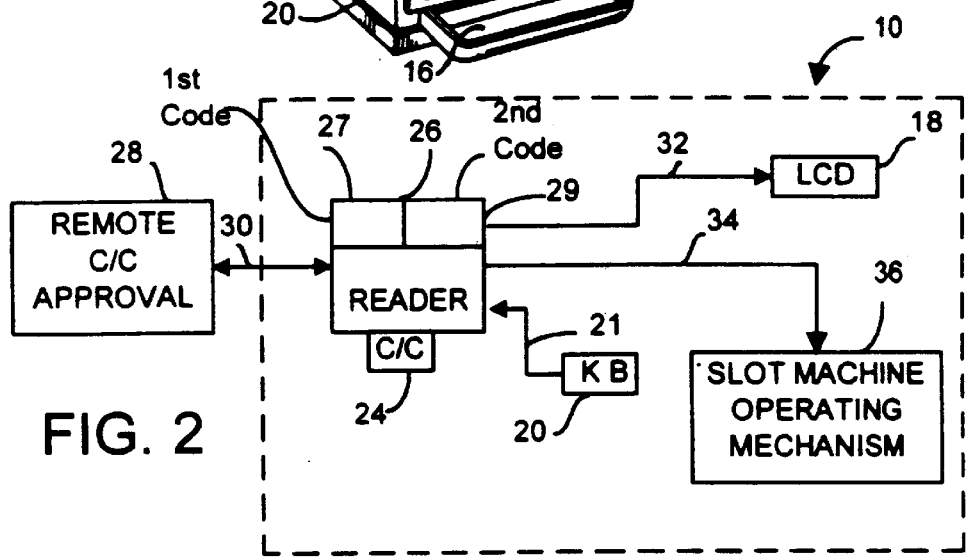
FIG. 2 is a diagrammatic representation of a circuit used in obtaining playing credit.

As shown in block diagram form in FIG. 2, the gaming machine 10 includes a card reader 26 having a slot or groove in which the charge card 24 is inserted as illustrated in FIG. 1 or through which the charge card may be swiped. The reader 26 is coupled with a remote card approval financial institution 28 where it is determined if the charge card is entitled to the credit requested and, optionally, if the person requesting playing credit is the rightful user of the card and meets any other conditions for the grant of the requested playing credit. Status of the card is returned over line 30 to reader 26 where status information is supplied to the liquid crystal display 18 on line 32. If the card is invalid, or the person requesting the playing credit is not entitled to it, the display so indicates. If the card is acceptable for the amount of credit desired, the liquid crystal display 18 gives instructions on making use of the credit through the use of the keyboard 20. The information generated through the keyboard 20 is coupled on line 21 to reader 26 which provides the necessary signals on line 34 to the gaming machine operating mechanism 36 to allow the player to use the credit by operating the gaming machine. As indicated earlier, the gaming machine operating mechanism 36 is already in existence and is used by players where credit is accumulated from winnings on the machine and the player simply continues to play the machine using the available credit that has been previously won.

In this case, the credit approved by the remote financial institution is transferred to the machine and the machine operates in continue ton manner to allow the player to continue to use the credit indicated, or the approved credit is transferred to an intermediate processing system where information pertaining to that credit is stored and can be accessed and updated as the player uses the credit so that the intermediate processing system can keep the updated status of the credit for some period of time, thus reducing the number of times the remote financial institution would be accessed in connection with the approved credit. Thus, with the novel features of the invention forming part of the gaming machine as illustrated in FIG. 1, the player does not need to leave the machine to obtain further credit, but simply inserts the charge card in slot 22 or swipes the card in the appropriate slot, enters the desired credit amount through keyboard 20 and when the remote institution has approved the credit, the machine indicates the amount of credit obtained and allows the player to continue to play the machine with the credit that was so obtained. When an intermediate processing system is used, located functionally between the gaming machine and the remote financial institution, that intermediate system maintains a net playing credit by initially receiving and recording in memory information regarding the approved credit, then communicating with the gaming machine to receive therefrom information respecting the win/lose/draw plays to keep track of a net playing credit, and communicating information respecting the net playing credit as needed to the remote financial institution. In this embodiment, the intermediate processing system serves as a processing facility which is different from and typically is remote from said financial institution.

As stated previously, a card reading device may be used which allows the card to be-swiped through a slot 22 where it is automatically read and the same procedure is followed to obtain the credit. Further, where a debit-type charge card is used, it would not be necessary to sign any credit slip since the unique code identifying the establishment and the unique code identifying the gaming machine are transmitted to the remote institution along with the player's identification and the proper debits and credits take place automatically. Still further, the player may be asked through the display to provide further identification such as, by way of an example only and without limitation, a PIN (personal identification number) code through keyboard 20.

Figure 3:
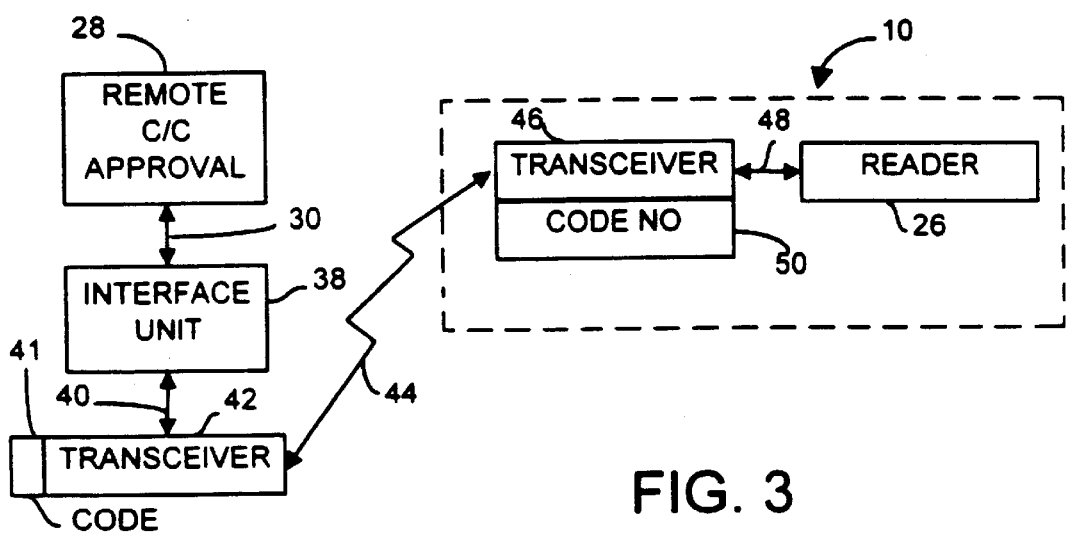
FIG. 3 is a diagrammatic representation of an alternate circuit for remotely communicating with the credit obtaining circuitry at the gaming machine.

In order for features of the invention to be used with the machine shown in FIG. 1, the necessary cabling or other communications link must be connected to the machine. If cabling is used, the machine has a fixed location and it cannot be moved conveniently because a move would involve disconnecting all of the cables and reconnecting them at a new location. In order to make the machine more easily movable, the invention may be modified as illustrated in FIG. 3 which is a block diagram representation of an alternate version in which a transceiver 46 is associated with the reader 26 shown in FIG. 2. The machine 10, in this case, need not be located in any particular fixed location, but can be conveniently moved as necessary to any desired location. In such case, the incoming signals from the financial institution such as those approving the card are coupled on line 30, which may be, for example, a telephone line, to an interface unit 38 in the casino. The interface unit couples the incoming signals to transceiver 42 on line 40. Transceiver 42 sends the signals through the air into a corresponding transceiver 46 in the gaming machine. The output of the transceiver is then coupled to reader 26 shown in FIG. 2, and the system operates as described previously. A code unit 50 storing a unique code is associated with each transceiver 46 identifying the particular gaming machine 10 that is to receive the signal. Thus, only that particular gaming machine 10 will be addressed from transceiver 42 when multiple gaming machines are being serviced in the same establishment. Such coding techniques are well known in the art. The unique codes may be assigned such that not only is the particular gaming machine 10 identified with its own code, but the establishment in which the machine is located may also be identified by a particular code 41 at transceiver 42, so that the remote financial institution approving the credit card has a record of not only the gambling institution, but also the particular gaming machine receiving the credit.

Figure 4:
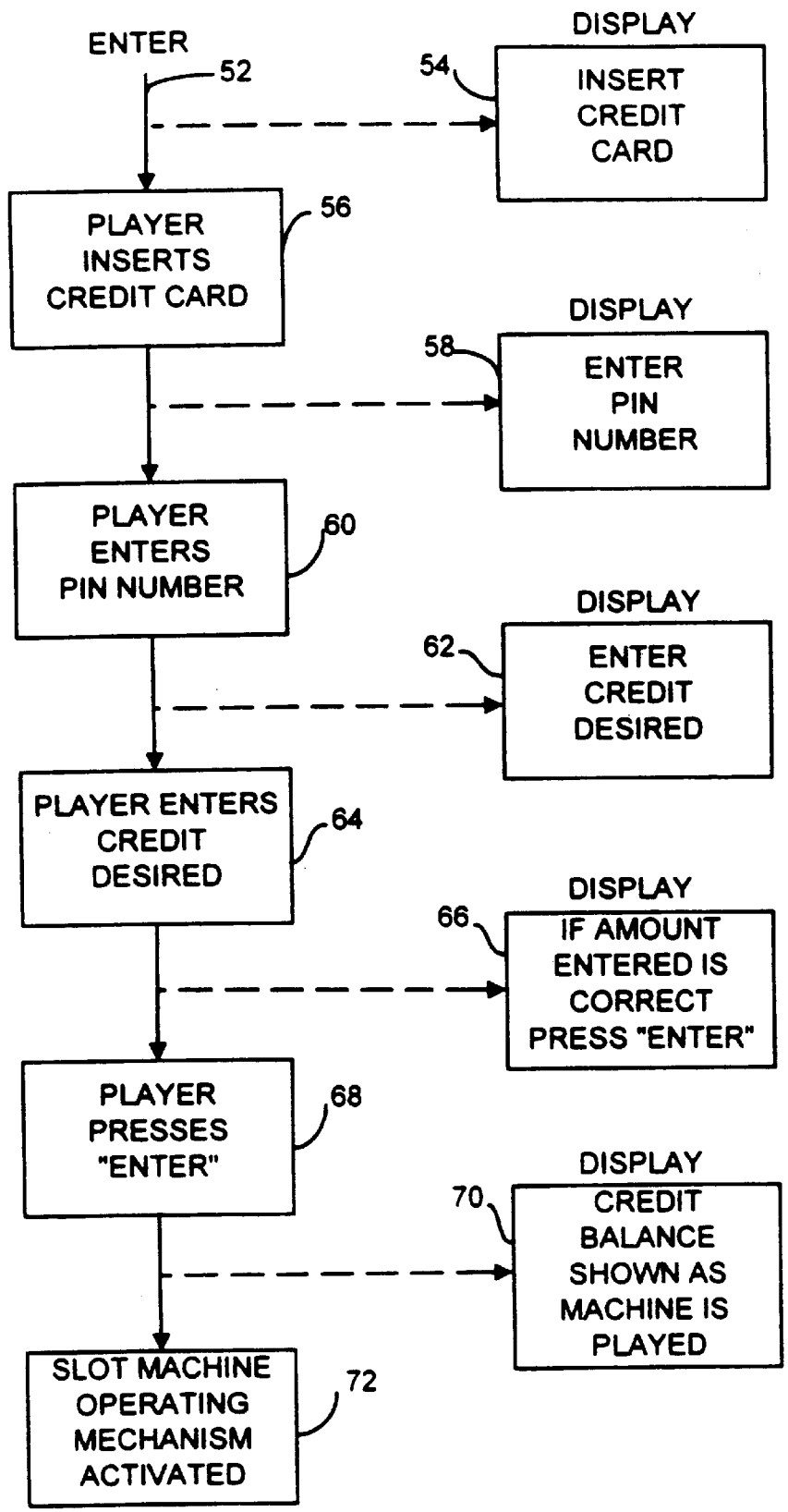
FIG. 4 is a flow chart illustrating steps taken by the player to obtain credit at the gaming machine without having to leave the machine.

FIG. 4 illustrates a flow chart of the operation of the reader 26 and associated circuits in the gaming machine 10. The system is entered at 52 by the player observing the display at 54 which may indicate, for example only, "INSERT CREDIT CARD". At step 56, the card is inserted in slot 22, or is swiped through a slot, and the display is observed at step 58. The display may show, for example only, a request for the entry of a PIN number. At step 60 the player enters the PIN number through the keyboard, and the display may indicate at 62 "ENTER CREDIT DESIRED". The player then enters the credit desired through the keyboard at step 64 and the display may indicate the amount entered and state "IF AMOUNT ENTERED IS CORRECT, PRESS ENTER". That is indicated at step 66. At step 68, the player presses the enter key and the display, at step 70 indicates the credit balance that was approved. As the machine is played the credit balance is reduced or increased. Thus if $10.00 is indicated as the credit obtained, and each play of the machine costs $1.00, the credit balance as shown will decrease by $1.00 each time the machine is played until the credit balance is zero or is altered by winnings obtained by the player. At step 72, the slot machine operating mechanism is activated so that the player can continue playing the machine. Actuators 17 enable the player to accept odds in a well-known manner. The player can select patterns diagonally or across or bet variable amounts of credit with each play with the use of the actuators 17 in a well-known manner.

Thus, there has been disclosed a novel apparatus and method of enabling a gaming machine to provide credit to a player operating the machine without leaving the machine. The player simply inserts or swipes a general purpose charge card in or through the reader and enters through the keyboard the amount of credit desired, and the financial institution at a remote distance from the machine approves or denies the credit which is indicated on the display on the machine itself. When the credit is obtained, the machine allows the player to use that credit in playing the machine without the player having to leave the machine to obtain the credit. The play transactions are processed and the ultimate debit or credit to the player's account in the financial institution and billing to the player are made in accordance with the invention.

Referring to FIG. 5, at step 80 a player supplies a general purpose charge card to a gaming machine at a casino, e.g., by feeding the card to a conventional magnetic card reader. The card reader reads selected information from the charge card, transmits it over a data link for validation, e.g., to the card issuer and, upon receiving back a validation over the data link, requests a personal identification number (PIN)

from the player. At step 82, which can be an optional step, the player enters the PIN, e.g., through a keypad or a keyboard at the gaming machine. If the PIN is similarly validated at step 84, the gaming machine prompts the player to enter an amount of requested playing credit, e.g., through a display or by a voice message. The player enters an amount of requested credit at step 86, the system checks at step 88 if any credit remains for the player from a previous transaction and processes such remaining credit at step 90. Upon player approval at step 92 of the processing up to that point, the system determines at step 94 whether to grant that requested credit on the basis of selected criteria. The determination may be made through another communication with the card issuer, or it can be made on the basis of some other criterion, such as whether the requested amount conforms to a selected threshold. Upon approval of the requested credit, or of some other amount of playing credit, the gaming machine at step 96 displays to the player the amount of granted playing credit available for play or pay-out at that gaming machine, and at step 98 enables the gaming machine to use said playing credit for plays. The player at step 100 can similarly request playing credit for one or more additional gaming machines and, upon approval by the system at step 102, such one or more additional gaming machines are enabled at step 104 for play by that player. The player plays the enabled machines, and the system at step 106 detects those plays and win/lose/draw results therefrom, as well as any pay-out requests by the player and any end-of-play requests by the player. The system maintains credit balances for the gaming machine, for the player and for the casino and at step 108 updates those balances in response to the detected play results, pay-out requests and end-of-play requests, and at step 110 displays at least the updated balance for the player at the gaming machine. The system at step 112 closes out requests for each enabled machine, as well as for the casino and the player, computes a daily balance at step 114, processes close out requests per machine, casino and player at step 116, and at step 118 posts a daily balance for at least the player to a credit process facility, where the balance is processed at step 120 for eventual use in the player's billing statement from the card issuer. The use of PIN number is optional. The system can be arranged to omit any use of a PIN number or to use some aid to identification other than a PIN number.

Figure 6:
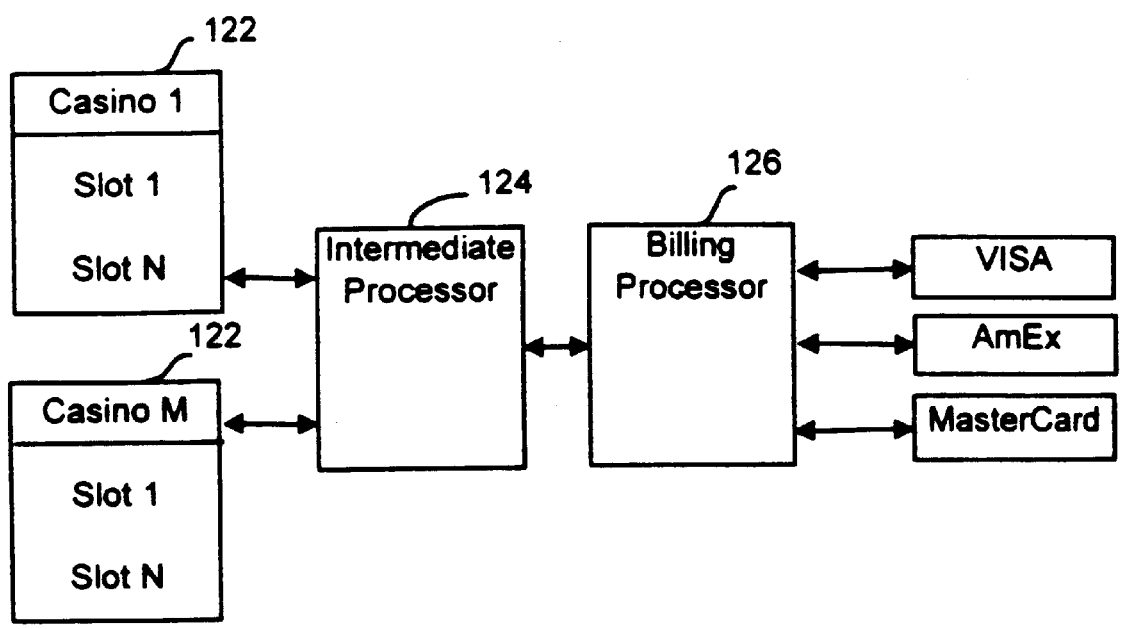
FIG. 6 is a diagrammatic representation of a circuit for obtaining credit through an intermediate processor.

The functional relation of the main elements of the system is illustrated in FIG. 6, where casinos 122, e.g., casinos 1 through M, each having gaming machines such as slot machines 1 through N, where M and N are positive integers, are connected through respective communication links with an intermediate processing system 124 which in turn is connected through respective communication links with remote financial institutions such as VISA, American Express and MasterCard. As described above, the remote financial institution approves a playing credit requested through a gaming machine at a casino or other gaming establishment, and intermediate processing system 124 keeps track of the net playing credit as the player plays games of chance, so that the remote financial institution can be accessed fewer times, e.g., only when the player ends playing or at a specified time, e.g., at closing time for the day, and any charge for the play can be communicated to the remote financial institution as a single line item for the day or the playing session even if it resulted from a great number of plays each changing the then current net playing credit. Still in addition, a bill processing facility 124 can be functionally interposed between the intermediate processing system and the remote financial institutions to accumulate information respecting the net playing credit as needed so that information defining a single line item on a player's bill from the remote financial institution can be supplied to the remote financial institution rather than accessing the remote financial institution more frequently.

Figure 7:
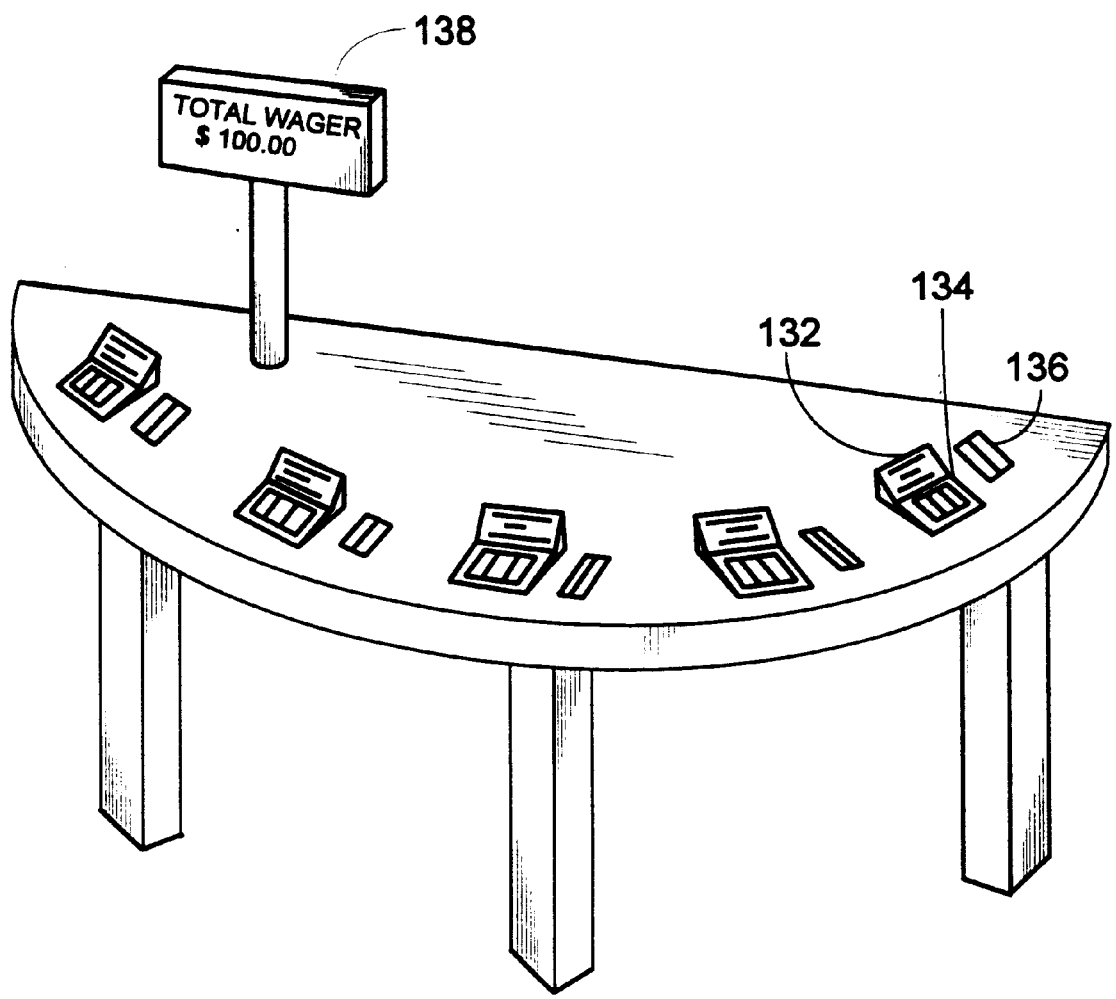
FIG. 7 is an isometric view of a multiple player gaming machine table.

As illustrated in FIG. 7, this invention also includes the use of credit obtained in accordance with this invention and of net playing credit in a multiple player game which can be played at a game table, such as poker. In this embodiment, each player participating in the game has a display 132, an input device 134 such as a keyboard or touch screen and, optionally, a card reader 136 through which playing credit can be obtained using a general purpose charge card in accordance with this invention. Each player's display and/or a separate display 138 at the table which is visible to all the players, shows the total amount of the wagered playing credit from all the players, that is, the "pot" and may also show individual player wagers, that is, each "bet". To make wagers, the player can enter the amount to wager on the input device. If the player wins, the player's net playing credit is increased by the amount in the pot, less any commission taken by the gaming operator which is credited to the gaming operator's account. The gaming operator may or may not be the owner of the particular establishment or location in which the gaming table or the participating players are located.

This invention also operates in a mixed environment, that is, some players can use the display and input device, other players can use cash or tokens, and still other players can use a combination. In such instances, the value of the wagered cash or tokens can be entered for display by the dealer, or the table may be equipped with a slot or other mechanism which automatically counts tokens or cash inserted therein, and the total pot can be, tallied automatically for display. Similarly, payouts can be made electronically to a winning player's net playing credit or in tokens or cash.

Additionally, this invention provides that gaming machines for multiple players, as with gaming machines for individual players, desirably can be located in business establishments and similar locations where the receiving and dispensing of coins or tokens is impractical. For example, any establishment or location which provides facilities for a computer which has appropriate gaming software and which can be connected to a remote financial institution, directly or through intermediate computers, provides a gaming establishment where a player might play a multiple player game through the gaming machine. Since most computers with these capabilities, for example modem-equipped personal computers, personal digital assistants (PDAs) and portable computers, typically do not have any way to receive or dispense coins or tokens, this invention provides that where the computer is serving as part of the gaming machine in a multiple player game, the computer can connect to a processing facility of the gaming operator and then directly or through other intermediate processing facilities to each of the players' remote financial institutions to obtain playing credit from each player's respective general purpose charge card. Alternatively, a player can connect directly to the remote financial institution and have the remote financial institution provide the credit approval to the gaming operator's processing facility. Once a computer is connected to the gaming operator's processing facility, the processing facility provides the means for each player to effect one or more of the following: (1) to obtain playing credit from the player's remote financial institution in accordance with this invention using a general purpose charge card; (2) to have a net playing credit maintained electronically; and (3) to have information about the game being played sent to and received from the processing facility. The game play information which is exchanged between the processing facility and a player's computer allows for additional capabilities. For example, the processing needed to emulate a mechanical gaming machine, such as wheel spinning for a slot machine, can be performed by either the processing facility or the player's computer.

Multiple player games are possible where the processing facility is connected to multiple gaming machines at the same time and where the processing facility receives game play information from each of these gaming machines. In fact, because players in different establishments or locations can be connected to the processing facility, the game operator can, in effect, create "electronic gaming tables". Thus, such computer based multiple player gaming machines can be used from virtually any location so long as a connection to the processing facility is provided for each player. In addition, using mobile communications such as cellular telephones, one or more of the multiple players and respective gaming machines can be in motion, such as on a transportation vehicle, while the game is played.

The operation of a gaming machine for multiple players according to this invention can be illustrated, by the following example of a passenger/player in a transportation vehicle. If the passenger wishes to play, the passenger can connect to a processing facility by a touch screen display panel or the like provided at the passenger's seat or by using a portable computer with appropriate software and a mobile communication device such as a cellular telephone. Once connected to the processing facility through the gaming software, the player can transmit a general purpose charge card number and/or other identification information such as the charge card's expiration date to request playing credit. Alternatively, the charge card can be read by a charge card reader provided at the passenger's location. Once the request is received, the processing facility, which can be a computer on-board the vehicle, determines what playing credit approval is needed to be obtained from a financial institution. In such a case the on-board processing facility calls from an on-board telephone or other communication system to either another intermediate processing facility of the gaming operator which can call a remote financial institution or directly to the remote financial institution to obtain approval for the requested playing credit. Once approved, the on-board processing facility keeps track of the net playing credit so that any time during the trip the player wishes to play, the net playing credit can be used without having to seek new approval from the financial institution. Even if the passenger changes his or her seat, by entering the charge card or other identifying information, the net playing credit can be transferred to another gaming machine at the new seat or, if the player wants to operate several gaming machines at the same time, the net playing credit can be accessed simultaneously from multiple gaming machines. This procedure for obtaining credit is the same as for the individual player, however, once credit is approved, the passenger can request to participate in a multiple player game. In response, the on-board processing facility attempts to form an electronic gaming table by checking if other passengers have requested such a game. Alternatively, the passenger can specify which passengers are to be included in the multiple player game. If no other passengers on the same vehicle are available or choose to participate in a multiple player game, the on-board processing facility can connect with other processing facilities to identify players at other locations. Alternatively, or in addition, at the passenger's request, the processing facility can simulate other players using simulation software. During the trip and/or when the trip has ended, the on-board computer can contact the gaming operator's processing facility, and/or the remote financial institution to update a passenger's account and/or the gaming operator's account in accordance with the changes to the net playing credit.

Another aspect of this invention, is the automatic conversion of the net playing credit into the wagering unit of the gaming machine being played. On most gaming machines, the display and list of payouts are based on a wagering unit for that gaming machine, such as, 5 cents, 25 cents, one dollar, five dollars etcetera; for example, 4 wagering units of the 25 cents machine is one dollar. In a traditional casino, when a player wishes to play a gaming machine with a different wagering unit the player must first cash in the coins or tokens of one wagering unit and then obtain coins or tokens of the other wagering unit. This invention, instead, provides that the net playing credit can be requested and/or played in the wagering unit of the gaming machine into which the player has inserted the general purpose charge card. So for example, a $100 net playing credit will be displayed as 400 at a 25 cent wagering unit gaming machine, but will be displayed as 200 at a 50 cent wagering unit gaming machine. In one embodiment of the invention, the player can select to have the net playing credit displayed in either the wagering unit of the game machine being played, in the local currency or in the wagering unit of the player's choice.

While the invention has been described in connection with a preferred embodiment, it is not intended to limit the scope of the invention to the particular form set forth but, on the contrary, it is intended to cover such alternatives, modifications, and equivalents as may be included within the spirit and scope of the invention as defined by the appended claims.

I claim:

1. An apparatus for using information concerning a first account maintained at an institution for enabling games of chance to be played on a gaming machine at a location which is remote from and is different from said institution, comprising:

means for causing information concerning said first account to be received by said gaming machine;

means for causing information concerning a requested playing amount to be received by said gaming machine;

means for causing information concerning a second account to be generated at said location, said second account associated with said gaming machine;

means for transmitting information concerning said first account, said requested amount, and said second account to said institution;

means for receiving an indication from said institution of an approved playing amount; and means for conditioning said gaming machine in accordance with said approved playing amount to permit plays thereon.

2. The apparatus of claim 1, wherein the means for causing information concerning said first account to be received by said gaming machine comprises a general purpose charge card.

3. The apparatus of claim 1, wherein said information concerning said first account and said requested amount causes said institution to provide said approved playing amount to said second account.

4. The apparatus of claim 2, wherein said general purpose charge card is a credit card.

5. The apparatus of claim 1, wherein said information concerning said first account and said requested amount causes said institution to transfer said approved playing amount from said first account to said second account.

6. The apparatus of claim 2, wherein said general purpose charge card is a debit card.

7. The apparatus of claim 2, wherein said general purpose charge card is an automated teller machine (ATM) card.

8. The apparatus of claim 2, wherein said general purpose charge card is a bank account access card.

9. An apparatus for using information concerning a first account maintained at an institution for enabling games of chance to be played on a gaming machine at a location which is remote from and is different from said institution, comprising:

at least one data entry device coupled to said gaming machine which receives information concerning said first account and a requested playing amount;

an account code generator coupled to said gaming machine which generates information concerning a second account;

a transmitter coupled to said account code generator and said data entry device which transmits information to said institution;

a receiver which receives information concerning an approved playing amount from said institution; and an activator coupled to said receiver and said gaming machine which permits plays on said gaming machine;

wherein said second account is associated with said gaming machine.

10. An apparatus for using information concerning an account maintained at an institution for enabling games of chance to be played on a gaming machine at a location which is remote from and is different from said institution, comprising:

means for causing information concerning said account to be received by said gaming machine;

means for causing information concerning a requested playing amount to be received by said gaming machine;

means for accessing a gaming account at a facility based on information concerning said account;

means for transmitting information concerning said account, and said requested amount to said facility;

means for receiving an indication from said facility of an approved playing amount;

means for conditioning said gaming machine in accordance with said approved playing amount to permit plays thereon;

means for maintaining information about said plays on said gaming machine; and means for selectively causing said gaming machine to transmit information respecting said plays to said facility for maintaining said gaming account.

11. The apparatus of claim 10, wherein the means for causing information concerning said account to be received by said gaming machine comprises a general purpose charge card.

12. The apparatus of claim 10, wherein said information concerning said account and said requested amount causes said institution to provide said approved playing amount to an account associated with said gaming machine.

13. The apparatus of claim 11, wherein said general purpose charge card is a credit card.

14. The apparatus of claim 10, wherein said information concerning said account and said requested amount causes said institution to transfer said approved playing amount from said account to an account associated with said gaming machine.

15. The apparatus of claim 11, wherein said general purpose charge card is a debit card.

16. The apparatus of claim 11, wherein said general purpose charge card is an automated teller machine (ATM) card.

17. The apparatus of claim 11, wherein said general purpose charge card is a bank account access card.

18. A method for using information concerning a first account maintained at an institution for enabling games of chance to be played on a gaming machine at a location which is remote from and is different from said institution, comprising the steps of:

causing information concerning said first account to be received by said gaming machine;

causing information concerning a requested playing amount to be received by said gaming machine;

causing information concerning a second account to be generated at said location, said second account associated with said gaming machine;

transmitting information concerning said account, said requested amount, and said second account to said institution;

receiving an indication from said institution of an approved playing amount; and conditioning said gaming machine in accordance with said approved playing amount to permit plays thereon.

19. The method of claim 18, wherein the step of causing information concerning said first account to be received by said gaming machine comprises the step of:

causing a data entry device to obtain said information from a general purpose charge card.

20. The method of claim 18, further comprising the step of:

providing, from said institution, said approved playing amount to said second account.

21. The method of claim 18, further comprising the step of:

transferring by said institution said approved playing amount to said second account from said first account.

22. A method of using information concerning an account maintained at an institution for enabling games of chance to be played on a gaming machine at a location which is remote from and is different from said institution, comprising the steps of:

causing information concerning said account to be received by said gaming machine;

causing information concerning a requested playing amount to be received by said gaming machine;

transmitting information concerning said account, and said requested amount to a facility;

accessing a gaming account at said facility based on information concerning said account;

receiving an indication from said facility of an approved playing amount;

conditioning said gaming machine in accordance with said approved playing amount to permit plays thereon;

maintaining information about said plays on said gaming machine; and selectively causing said gaming machine to transmit information respecting said plays to said facility for maintaining said gaming account.

23. The method of claim 22, wherein the step of causing information concerning said account to be received by said gaming machine comprises the step of:

causing a data entry device to obtain said information from a general purpose charge card.

24. The method of claim 22, further comprising the step of:

providing, from said institution, said approved playing amount to a second account associated with said gaming machine.

25. The method of claim 22, further comprising the step of:

transferring by said institution said approved playing amount to a second account associated with said gaming machine from said first account.

26. A method of using a charge card to play games of chance comprising:

providing a gaming machine at a casino with information regarding a charge card issued by an institution which is different from the casino and is remote from the casino, and with information regarding a requested quantity pertaining to playing games of chance;

transmitting information regarding the charge card and the requested quantity, as well as information regarding the gaming machine, from the gaming machine to an authorizing facility which is different from the casino and is remote from the casino;

using at the authorizing facility at least some of the information transmitted thereto to produce information regarding an approved quantity;

transmitting information regarding the approved quantity from the authorizing facility to the gaming machine;

using information transmitted to the gaming machine regarding the approved quantity to enable the gaming machine to play games of chance;

creating and maintaining a gaming account related to both the approved quantity and to results of games of chance played at the gaming machine following the receipt thereby of information regarding the approved quantity.

27. A method as in claim 26, in which the providing of information regarding the charge card comprises scanning the charge card at a card reader associated with the gaming machine.

28. A method as in claim 26, in which the institution that issued the charge card and the authorizing facility are the same entity.

29. A method as in claim 26, in which the charge card is a credit card.

30. A method as in claim 26, in which the charge card is a debit card.

31. A method as in claim 26, in which the charge card is a card issued by a bank.

32. A method as in claim 26 in which the charge card is an automated teller machine (ATM) card.

33. A method as in claim 26 further comprising maintaining a card account associated with the charge card and debiting the card account in an amount related to the approved quantity and crediting the gaming account with an initial amount also related to the approved quantity.

34. A method as in claim 26 in which the charge card is a bank account access card.

* * * * *